US005583290A

United States Patent [19]

Lewis

[11] Patent Number: 5,583,290
[45] Date of Patent: Dec. 10, 1996

[54] MICROMECHANICAL APPARATUS WITH LIMITED ACTUATION BANDWIDTH

[75] Inventor: Stephen R. Lewis, Reading, Mass.

[73] Assignee: Analog Devices, Inc., Norwood, Mass.

[21] Appl. No.: 359,520

[22] Filed: Dec. 20, 1994

[51] Int. Cl.⁶ ........................................... G01P 15/00
[52] U.S. Cl. ................. 73/514.18; 73/1 DV; 73/862.61; 73/514.32
[58] Field of Search .................. 73/517 B, 517 R, 73/862.61, 701, 1 D, 1 DV, 514.18, 514.32; 324/661, 662, 678; 361/280, 283.1

[56] References Cited

U.S. PATENT DOCUMENTS

| | | | |
|---|---|---|---|
| 3,120,622 | 2/1964 | Dranetz et al. | 310/8.4 |
| 4,922,756 | 5/1990 | Henrion | 73/517 |
| 5,060,504 | 10/1991 | White et al. | 73/1 D |
| 5,103,667 | 4/1992 | Allen et al. | 73/1 D |
| 5,253,510 | 10/1993 | Allen et al. | 73/1 D |
| 5,314,572 | 5/1994 | Core et al. | 156/643 |
| 5,326,726 | 7/1994 | Tsang et al. | 437/228 |
| 5,345,824 | 9/1994 | Sherman et al. | 73/517 B |
| 5,364,497 | 11/1994 | Chau et al. | 156/645 |
| 5,433,101 | 7/1995 | Spangler et al. | 73/1 D |
| 5,445,006 | 8/1995 | Allen et al. | 73/1 D |
| 5,447,051 | 9/1995 | Hanks et al. | 73/1 D |
| 5,465,604 | 11/1995 | Sherman | 73/1 DV |
| 5,492,020 | 2/1996 | Okada | 73/862.626 |

FOREIGN PATENT DOCUMENTS

| | | |
|---|---|---|
| 59-95266 | 6/1984 | Japan . |
| 63-85461 | 4/1988 | Japan . |

Primary Examiner—Hezron E. Williams
Assistant Examiner—Richard A. Moller
Attorney, Agent, or Firm—Wolf, Greenfield & Sacks, P.C.

[57] ABSTRACT

A micromechanical sensing apparatus includes a micromechanical sensor having a stationary element and a movable element which are electrically conductive, and a sensing circuit responsive to the micromechanical sensor for generating an output indicative of a sensed quantity. The sensing circuit may have a closed loop configuration or an open loop configuration. The sensing apparatus further includes an actuation circuit for applying to the micromechanical sensor an actuation signal, such as a test signal, for electrostatically deflecting the movable element relative to stationary element. The actuation circuit includes circuitry for limiting the bandwidth of the actuation signal such that the deflection of the movable element does not exceed maximum deflection limits. In the closed loop configuration, the bandwidth of the actuation signal is preferably limited to less than or equal to the closed loop bandwidth of the sensing circuit. As a result, electrostatic capture and/or contact between the movable element and the stationary element is prevented.

26 Claims, 4 Drawing Sheets

5,583,290

MICROMECHANICAL APPARATUS WITH LIMITED ACTUATION BANDWIDTH

FIELD OF THE INVENTION

This invention relates to micromechanical devices which include a stationary element and a movable element and, more particularly, to a technique for preventing contact between the movable and stationary elements when an actuation signal is applied to the device.

BACKGROUND OF THE INVENTION

Micromechanical sensors for sensing a physical quantity, such as acceleration, vibration or electrostatic potential, are useful in many applications, including air bag deployment and active suspension in automobiles, and guidance systems in military weapons, among others. A micromechanical sensing apparatus may include a micromechanical sensor in-the form of a suspended microstructure and a circuit responsive to the micromechanical sensor for providing an output representative of a sensed quantity. The suspended microstructure includes stationary and movable elements which are conductive. The micromechanical sensor may be configured for sensing acceleration. When an acceleration sensor of this type is subjected to an accelerative force, the movable element moves relative to the stationary element, producing an electrical output that is sensed by the circuit. The stationary and movable elements form a capacitor which changes in capacitance when the sensor is subjected to an accelerative force. The micromechanical sensor may have a differential capacitor configuration in which one capacitor increases and the other capacitor decreases when the sensor is subjected to an accelerative force.

In certain instances, an actuation signal may be applied to the micromechanical sensor. For example, one way of testing such micromechanical sensing apparatus is by application of an actuation signal, or test signal, to the capacitors. The test signal may, for example, be a pulse of prescribed amplitude. The test signal charges the capacitors, causing electrostatic deflection of the movable element relative to the stationary element. The deflection produces an output from the circuit. One problem that may occur in connection with electrostatic deflection of the movable element by a test signal is that the movable element may come in contact with the stationary element. Such contact is undesirable, since sticking between the contacting surfaces is likely, particularly when one or both of the surfaces is polysilicon. When a portion of the suspended microstructure sticks to another portion of the device, it is very difficult to separate the two, thereby frequently resulting in failure of the device. It is therefore desirable to provide methods and apparatus for electrostatically deflecting the elements of a microstructure with an actuation signal, while reducing or eliminating the risk that the elements will contact each other.

Contact between the stationary and movable elements of a microstructure may result from electrostatic deflection in two related ways. The movable element may be deflected in response to a relatively large actuation signal that is sufficient to bring the movable element in contact with the stationary element. In addition, electrostatic capture may be caused by an AC or DC potential difference (or both together) between the movable element and the stationary element. The force caused by any potential difference is attractive and increases relative to 1/(gap distance)$^2$. Thus, as the stationary and movable elements get closer, the force gets stronger faster than the pulling back tendency of the mechanical spring, which is linear with distance. With very sensitive microstructures that have a weak spring, the movable element does not have to move very far before the attractive forces overcome the restoring force of the spring. In this case, the movable element is drawn into contact with the stationary element and is electrostatically captured. A relatively small actuation signal may deflect the movable element within the electrostatic capture range of the stationary element. It is desirable to prevent contact which may result from a relatively large actuation signal or from electrostatic capture.

SUMMARY OF THE INVENTION

According to a broad aspect of the invention, a micromechanical apparatus comprises a micromechanical device, including a stationary element and a movable element which are electrically conductive, and actuation circuit coupled to the micromechancial device for applying to the micromechancial device an actuation signal for electrostatically deflecting the movable element relative to the stationary element. The actuation circuit includes circuitry for limiting the bandwidth or the actuation signal to prevent contact between the movable element and the stationary element.

According to an important aspect of the invention, a micromechanical sensing apparatus comprises a micromechanical sensor including a stationary element and a movable element which are electrically conductive, a force balance loop coupled to the micromechanical sensor for generating an output indicative of a sensed quantity and for electrostatically controlling the position of the movable element relative to the stationary element, and an actuation circuit coupled to the micromechanical sensor for applying to the sensor an actuation signal for electrostatically deflecting the movable element relative to the stationary element. The circuit includes circuitry for limiting the bandwidth of the actuation signal such that the force balance loop controls deflection of the movable element within maximum deflection limits and prevents contact between the movable element and the stationary element. Preferably, the circuitry limits the bandwidth of the actuation signal to less than or equal to the closed loop bandwidth of the force balance loop. In one embodiment, the actuation signal comprises a test signal for use in testing the micromechanical sensing apparatus, The stationary element and the movable element of the micromechanical sensor preferably define a first capacitor and a second capacitor having a differential configuration such that, as the movable element is deflected, one of the capacitors increases and the other of the capacitors decreases. The micromechanical sensor, in one example, comprises a semiconductor substrate, a plurality of posts extending from the surface of the substrate, a polysilicon bridge suspended from the posts, the bridge comprising a plurality of movable fingers which constitute the movable element, and a plurality of electrically conductive, substantially stationary fingers which constitute the stationary element. Each of the substantially stationary fingers corresponds to one of the movable fingers and is positioned relative to the corresponding movable finger such that the movable finger and the corresponding substantially stationary finger form a capacitor. Movement of the bridge causes the movable fingers to move relative to the substantially stationary fingers and alter the capacitance between the movable fingers and the corresponding substantially stationary fingers.

According to another aspect of the invention, a micromechanical sensing apparatus comprises a micromechanical sensor including a stationary element and a movable element which are electrically conductive, a sensing circuit coupled to the micromechanical sensor for generating a signal indicative of a sensed quantity, and an actuation circuit coupled to the micromechanical sensor for applying to the sensor an actuation signal for electrostatically deflecting the movable element relative to the stationary element. The sensing circuit has an open loop configuration. The actuation circuit includes circuitry for limiting the bandwidth of the actuation signal to prevent contact between the movable element and the stationary element. In a preferred embodiment, the bandwidth of the actuation signal is limited to about one tenth of the mechanical resonance frequency of the micromechanical sensor. As a result, large deflections of the movable element are prevented.

According to a further aspect of the invention, a method for actuating a micromechanical sensing apparatus as described above comprises applying to the micromechanical sensor an actuation signal for electrostatically deflecting the movable element relative to the stationary element, and limiting the bandwidth of the actuation signal such that the force balance loop controls deflection of the movable element within maximum deflection limits. Preferably, the bandwidth is limited to less than or equal to the closed loop bandwidth of the force balance loop.

BRIEF DESCRIPTION OF THE DRAWINGS

For a better understanding of the present invention, reference is made to the accompanying drawings, which are incorporated herein by reference and in which.

DETAILED DESCRIPTION

A micromechanical sensing apparatus typically includes a micromechanical device, such as a micromechanical sensor, in the form of a suspended microstructure and a circuit responsive to the micromechanical sensor for providing an output representative of a sensed quantity. Preferably, the micromechanical sensor and the circuit are fabricated on a single substrate in a monolithic construction. In the example descraped below, the micromechanical sensing apparatus is configured as an accelerometer. However, it will be understood that the micromechanical sensing apparatus can be configured for sensing other physical quantities, such as, for example, vibration or electrostatic potential. Furthermore, the micromechanical device is not limited to micromechanical sensors. In general the micromechanical device is a microstructure including a stationary element and a movable element that are electrically conductive.

Figure 1:
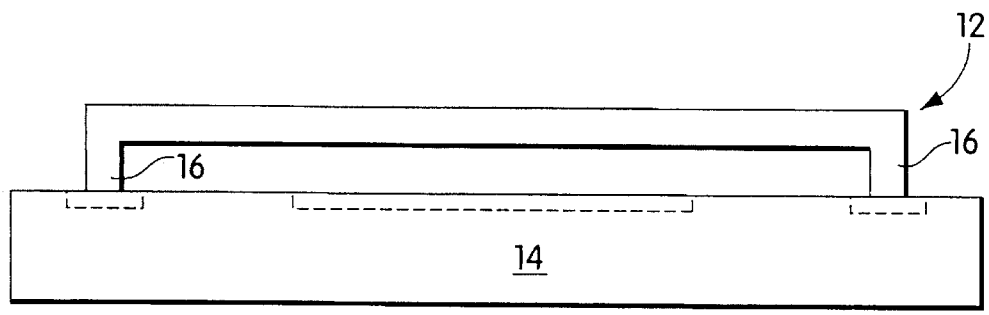
FIG. 1 is a side view of the bridge portion of an exemplary microstructure.
Figure 2:
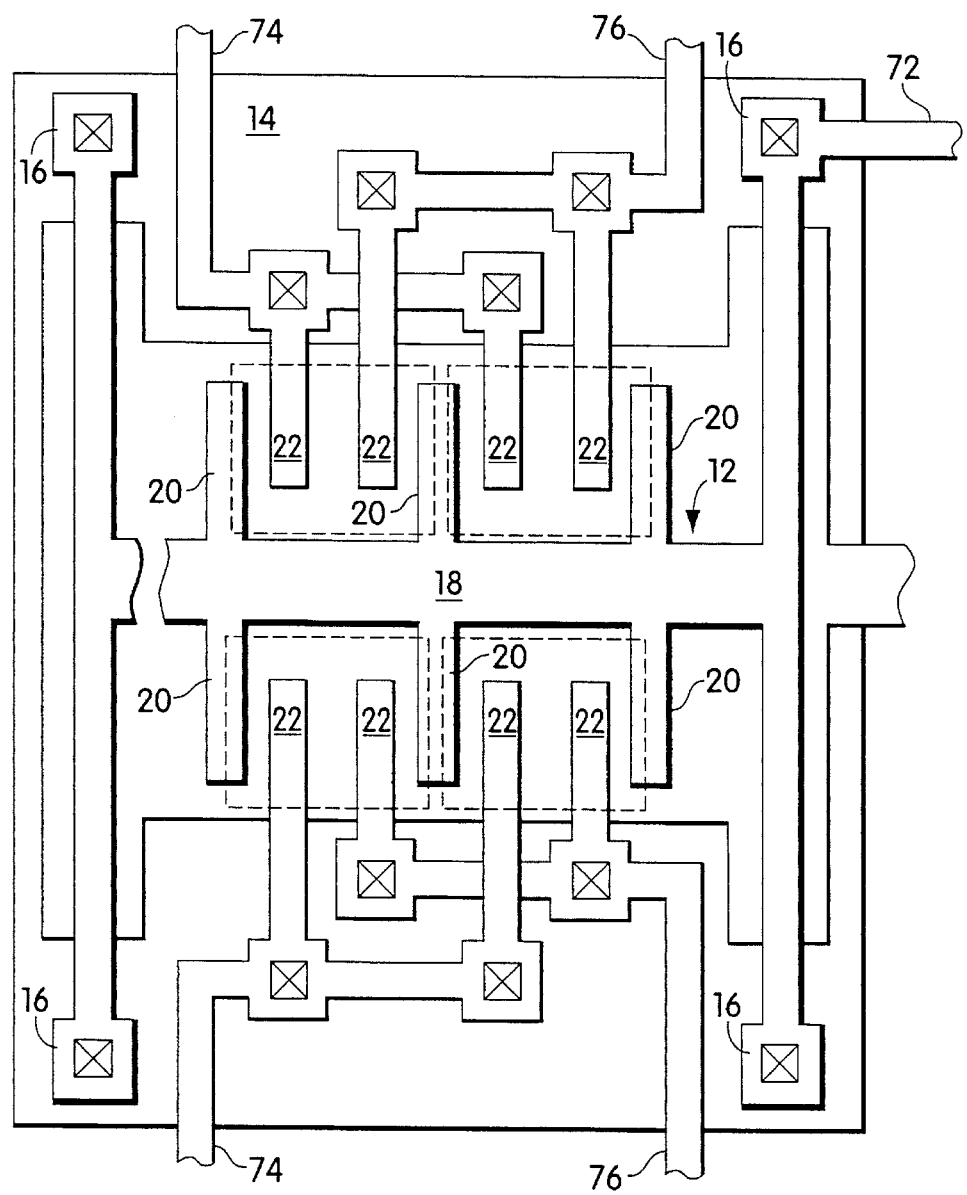
FIG. 2 is a top plan view of the microstructure of FIG. 1.

FIG. 1 is a side view and FIG. 2 is a top plan view of an exemplary suspended microstructure. The microstructure comprises a bridge 12 suspended above a substrate 14 by four corner anchors 16. The bridge comprises a central beam 18 having a plurality of fingers 20 extending transversely therefrom. A suspended polysilicon stationary finger, 52 is positioned parallel and adjacent to each finger 20 of the bridge 12. Stationary fingers 22 are also suspended on anchors and cantilevered over the substrate, but are substantially stationary because of their smaller mass and shorter length of extension beyond the anchor. The polysilicon of the stationary fingers 22 and the bridge 12 is electrically conductive. The stationary fingers are connected via conductors formed in the substrate to comprise two electrical nodes. In particular, the stationary fingers to the left of the corresponding movable fingers form a first node, connected to a lead 76, which is charged to a first voltage. The stationary fingers to the right of the corresponding movable fingers form a second node, connected to a lead 74, which is charged to a second voltage. The beam 12, including the movable fingers, forms a third node, connected to a lead 72, which is charged to a third voltage between the first and second voltages.

The first and second sets of stationary fingers and the movable fingers for two capacitors. The two sets of stationary fingers form the first plate of the first and second capacitors, respectively, and the movable fingers form the second plate of both capacitors. When the device is subjected to a force, the beam 12 moves relative to the stationary fingers 22, thus altering the capacitance between each stationary finger 22 and its corresponding movable finger 20. Also, the beam 12 may be electrostatically deflected by application of an AC or DC voltage between the stationary and movable fingers.

One method for fabricating devices with suspended microstructures as described above is generally termed surface micromachining. Surface micromachining involves additive forming of the microstructure over a substrate. U.S. Pat. No. 5,345,824, issued Sep. 13, 1994, and assigned to the assignee of the present application, discloses in detail one such method for manufacturing a surface micromachined suspended microstructure.

A circuit (not shown in FIGS. 1 and 2) measures the change in aggregate capacitance, which directly indicative of the acceleration to which the bridge is subjected. Preferably, the circuit has a closed loop configuration and provides a feedback signal which re-centers the beam when it is offset from its equilibrium positions by acceleration. Alternatively, the circuit may have an open loop configuration which measures the change in aggregate capacitance without feedback.

Figure 3:
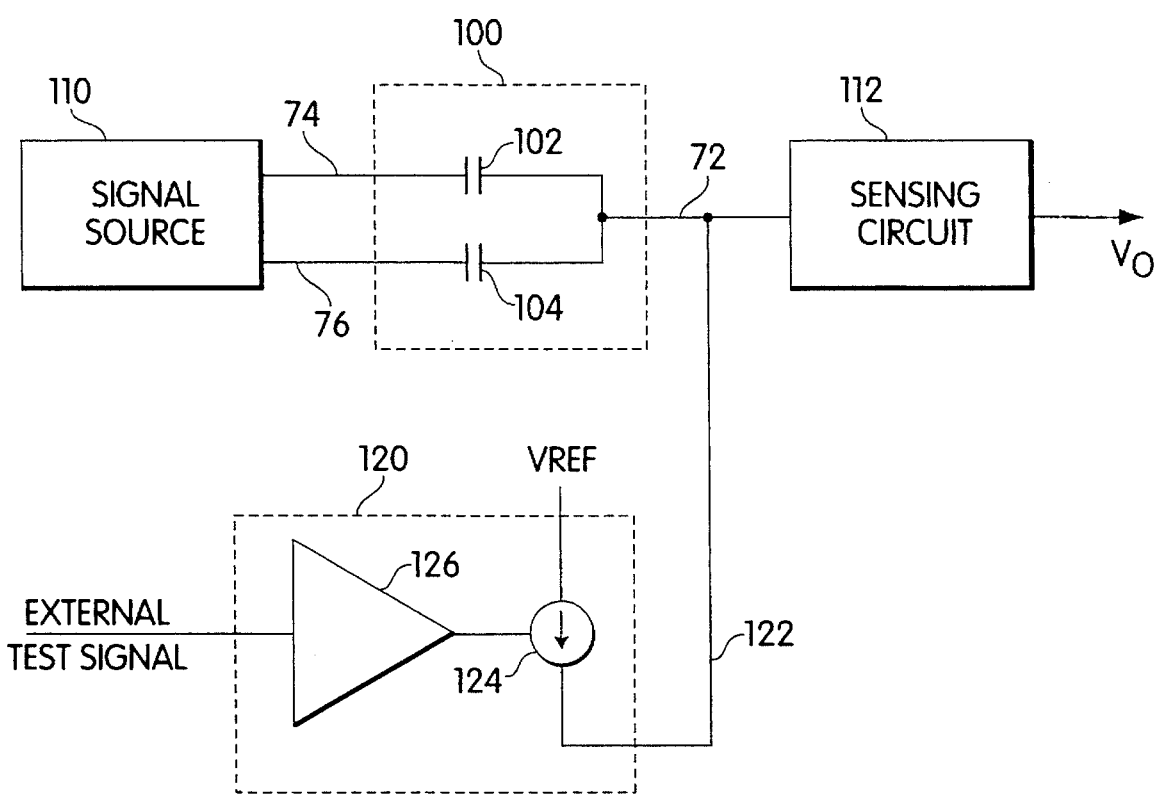
FIG. 3 is a block diagram of a micromechanical sensing device which incorporates a test circuit.

A block diagram of a micromechanical sensing apparatus incorporating the present invention is shown in FIG. 3. An acceleration sensor 100 can be fabricated, for example, as shown and described above in connection with FIGS. 1 and 2. The acceleration sensor 100 is represented by differential capacitors 102 and 104. Lead 74 of capacitor 102 is connected to one set of stationary fingers in FIG. 2, and lead 76 of capacitor 104 is connected to the other set of stationary fingers in FIG. 2. Lead 72 of capacitors 102 and 104 connected to the movable fingers in FIG. 2. When an accelerative force is applied to the sensor 100, one of the differential capacitors increases in capacitance, and the other capacitor decreases.

A signal source 110 drives the capacitors 102 and 104 with sinusoidal signals of equal frequency and amplitude but of opposite polarities (180° out of phase). Consequently, the amplitude and phase of the signal at lead 72 of the differential capacitors is a function of the difference in capacitance, which is directly related to the force-induced displacement of the capacitor electrodes due to acceleration. A sensing circuit 112 connected to lead 72 processes this signal to generate an output signal $V_O$ indicative of the acceleration of the capacitor plates relative to the substrate. Additional details regarding the signal source and the sensing circuit are disclosed in U.S. Pat. No. 5,345,824, which is hereby incorporated by reference.

A test circuit 120 receives an external test signal for activation of a test and provides a test signal, or actuation signal, on line 122 to capacitors 102 and 104. With reference to FIG. 2, the test signal on line 122 is applied to movable beam 12. The test circuit 120 may include a current source 124 which is controlled by a circuit 126. When the external test signal is active, the current source 124 is switched on, causing capacitors 102 and 104 to be charged. The charging of capacitors 102 and 104 produces an electrostatic force which deflects the movable fingers 20 relative to the stationary fingers 22. The change in capacitance is sensed as described above by sensing circuit 112, which produces an output voltage $V_O$ indicative of the deflection. An equivalent deflection is produced by application of a test signal to the stationary fingers (leads 74 and 76 of sensor 100).

The application of a test signal to sensor 100 on line 122 may produce sufficient electrostatic deflection to cause contact between the movable fingers and the stationary fingers. Contact between the movable fingers and the stationary fingers may result either from a relatively large electrostatic deflection or from deflection that is sufficient to cause electrostatic capture. Contact is likely to result in sticking between the movable fingers and the stationary fingers. In accordance with the present invention, the frequency content of the actuation signal applied to the micromechanical sensor is limited so as to control electrostatic deflection within maximum deflection limits and thereby avoid sticking. The deflection limits are those which avoid electrostatic capture and/or contact between the movable fingers and the stationary fingers. The deflection required to cause contact in a suspended microstructure is typically on the order of one micrometer. When the acceleration sensor includes a force balance loop, the bandwidth of the test signal is selected relative to the closed loop bandwidth of the force balance loop to insure that the force balance loop can control electrostatic deflection by the test signal and thereby prevent contact between the fixed and movable elements. When the acceleration sensor has an open loop configuration, the bandwidth of the test signal is selected relative to the mechanical resonances frequency of the sensor 100 to avoid large amplitude electrostatic deflections which could result in contact between the stationary and movable elements. The bandwidth requirements for the test signal or other actuation signal are discussed in more detail below.

Figure 4:
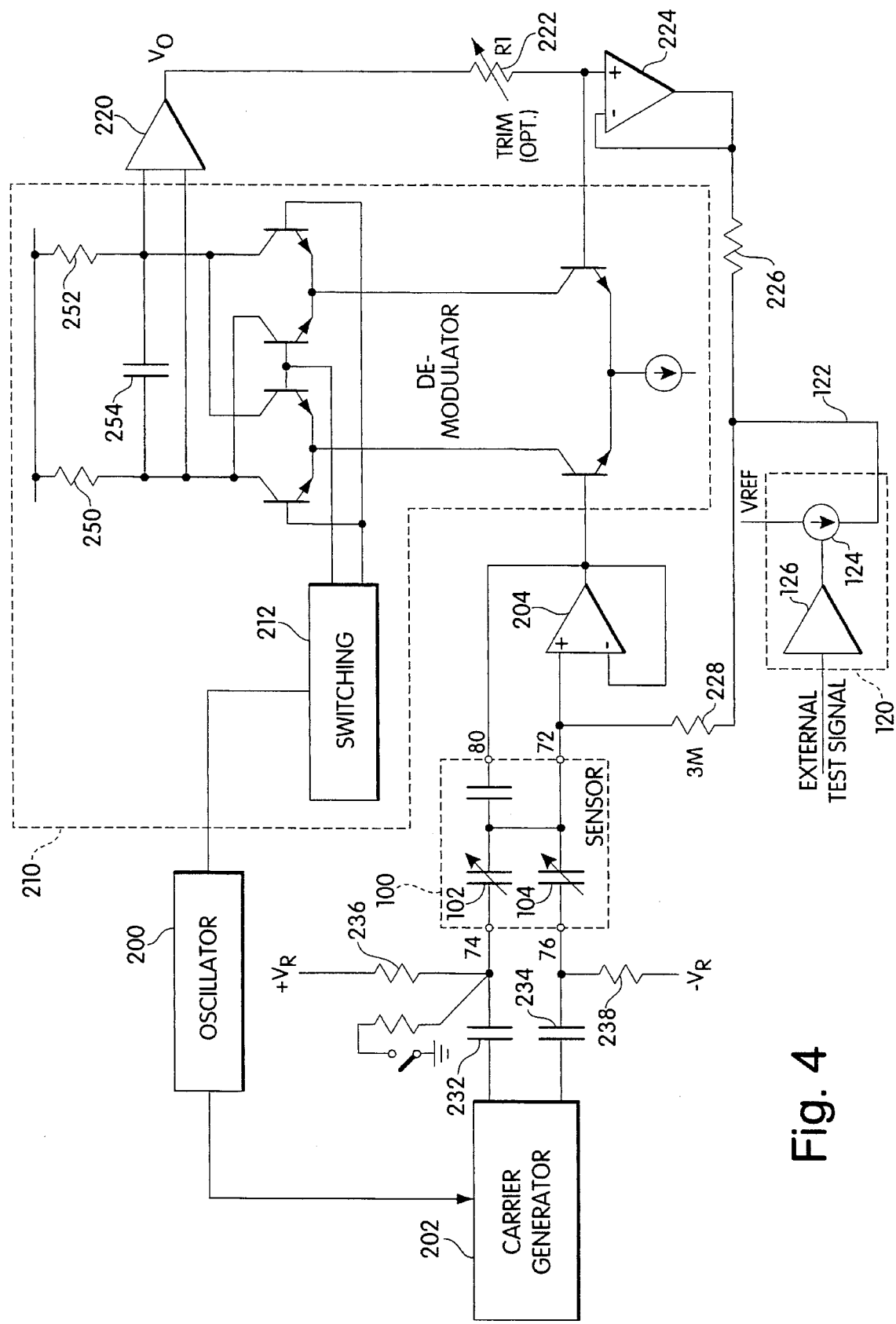
FIG. 4 is a block diagram of a micromechanical sensing device which incorporates a force balance loop and a test circuit.

An accelerometer incorporating a force balance loop is shown in FIG. 4. An oscillator 200 supplies an approximately 1 MHz sinusoidal signal to a carrier generator 202. The carrier generator 202 supplies two 1 MHz sinusoidal output signals of equal amplitude and 180° out of phase. The first carrier signal is AC coupled to lead 74 of sensor 100 through a capacitor 232, and the second carrier signal is AC coupled to lead 76 through a capacitor 234. Sensor output lead 72 is connected to the noninverting input of a buffer amplifier 204. The output of the buffer amplifier is connected to a lead 80, which is a bootstrap diffusion contact of sensor 100. Through this connection, the parasitic capacitance is prevented from loading the common lead 72. The output of the buffer amplifier 204 is supplied to a synchronous switching demodulator 210. The demodulator includes a switching circuit 212 which is connected to and is responsive to the output of oscillator 200. The double-ended output from the demodulator 210 is converted to a single-ended output voltage $V_0$ by a buffer amplifier 220. The output voltage $V_0$ is representative of the acceleration applied to the accelerometer. The output voltage $V_0$ of buffer amplifier 220 is supplied through an optional trim resistor 222 to the noninverting input of a feedback buffer amplifier 224. The output of feedback buffer amplifier 224 supplies a feedback signal through a resistor 226 and a resistor 228 to lead 72 of the sensor 100. As shown in FIG. 2, the lead 72 is connected to the movable beam of the acceleration sensor 100. To establish a net electrostatic force on the sensor capacitor plates, input leads 74 and 76 are connected to positive and negative offset supplies $V_R$ and $-V_R$ through resistors 236 and 238, respectively. When the capacitors 102 and 104 are equal (zero acceleration), the electrostatic potential across the capacitors is balanced and equal. Acceleration causes the capacitors to have different values and the electrostatic potential on them to be unequal, causing a net unbalancing force. The test circuit 120 has output 122 connected to the junction of resistors 226 and 228.

The force balance loop shown in FIG. 4 and described above uses feedback to control the position of the movable fingers 20 (FIG. 2) with respect to the stationary fingers 22 of the sensor 100 by electrostatic deflection of the capacitor plates. The net deflection of the movable fingers 20 is reduced in proportion to the gain of the feedback loop. Thus, for a closed loop gain of 10, the net deflection is reduced by a factor of 10 in comparison with the open loop deflection. However, the force balance loop functions over a limited frequency range, known as the closed loop bandwidth of the loop. In the example of FIG. 4, the closed loop bandwidth is established by resistors 250 and 252, capacitor 254 and the loop gain characteristics of the demodulator 210, amplifier 220 and the beam signal transfer gain. The closed loop bandwidth may, for example, have a value of about 1 KHz. An accelerative force having frequency components within the closed loop bandwidth of the force balance loop can be controlled by the loop, whereas an accelerative force having frequency components outside the closed loop bandwidth of the force balance loop cannot be fully controlled and may deflect the movable beam 12 by a sufficient amount to cause contact between the movable fingers 20 and the stationary fingers 22.

A test signal or other actuation signal applied to the sensor 100 by the test circuit 120 produces an effect that is equivalent to an accelerative force. In particular, the test signal electrostatically deflects the movable fingers 20 of the sensor 100 with respect to the stationary fingers 22. The electrostatic deflection by the test signal is controlled by the force balance loop in the same manner as deflection caused by acceleration. Thus, when the test signal on line 122 has frequency components within the closed loop bandwidth of the force balance loop, the electrostatic deflection is controlled by the force balance loop. However, when the test signal has significant frequency components outside the closed loop bandwidth of the force balance loop, the force balance loop is unable to respond to those frequency components, and a large deflection may occur. A large deflection may cause contact between the movable fingers 20 and the stationary fingers 22 and produce sticking between these elements. Alternatively, contact may be produced by a test signal that is sufficient for electrostatic capture of the movable fingers 20. A fast risetime pulse is an example of a test signal that may have significant frequency components outside the closed loop bandwidth of the force balance loop. The sensor 100 typically has a very small capacitance (on the order of 0.1 pF) and does not appreciably limit the bandwidth of the test signal.

In accordance with the invention, the bandwidth of the actuation signal (the test signal on line 122) is limited with respect to the closed loop bandwidth of the force balance loop, so as to prevent electrostatic deflection of the movable element relative to the stationary element of sensor 100 from exceeding a maximum value. This is preferably achieved by limiting the bandwidth of the test signal to less than or equal to the closed loop bandwidth of the force balance loop. However, a broader actuation signal bandwidth may be used. The primary requirement is to tailor the bandwidth of the actuation signal to prevent contact between the movable and stationary elements. For a force balance loop having a closed loop bandwidth of 1 kHz, the test signal bandwidth is preferably limited to about 1 kHz or less. In particular, a pulse test signal is limited to a relatively slow switching speed that falls within the closed loop bandwidth of the force balance loop. Under these conditions, the force balance loop can follow the electrostatic deflection produced by the test signal and prevent electrostatic capture and/or contact, and consequent sticking. As-noted above, sensor 100 may be used in an open loop configuration, as represented by FIG. 3, wherein the sensing circuit 112 does not provide feedback to the sensor 100. Additional details regarding an open loop configuration are disclosed in U.S. Pat. No. 5,345,824. In the open loop configuration, the sensing circuit 112 senses the voltage at lead 72 of sensor 100 and provides an output voltage of $V_0$ representative of the difference in capacitance between capacitors 102 and 104, which in turn is representative of the deflection of movable fingers 20 relative to the stationary fingers 22. The deflection may be caused by an accelerative force applied to the sensor 100 or by an actuation signal. The force opposing electrostatic deflection of the sensor structure results from the mechanical spring constant of the structure. As is well known, the mechanical structure has a mechanical resonance frequency at which the spring constant is a minimum and deflection is maximized. In accordance with another aspect of the invention, the frequency content of the actuation signal at or near the mechanical resonance frequency of sensor 100 is reduced as much as is practical. In practice, this may be achieved by limiting the actuation signal bandwidth to about one tenth of the mechanical resonance frequency. However, a broader actuation signal bandwidth may be used. The primary requirement is to tailor the bandwidth of the actuation signal to prevent contact between the movable and stationary elements. A typical mechanical resonance frequency of a suspended microstructure is on the order of a few kilohertz to about 100 kHz. By limiting the bandwidth of the test signal relative to the mechanical resonance frequency of the sensor structure, large electrostatic deflections, which could result in electrostatic capture and/or contact between the stationary and movable elements, are avoided.

Techniques for controlling the bandwidth of a test signal are well known to those skilled in the art. For example, the test signal may be limited in bandwidth by controlling its switching speed with a resistor and capacitor combination or a current source and capacitor combination. Other techniques, including inductors and digital techniques, may also be utilized. In general, any technique capable of providing a test signal with a bandwidth that is limited as described above can be utilized.

Figure 5:
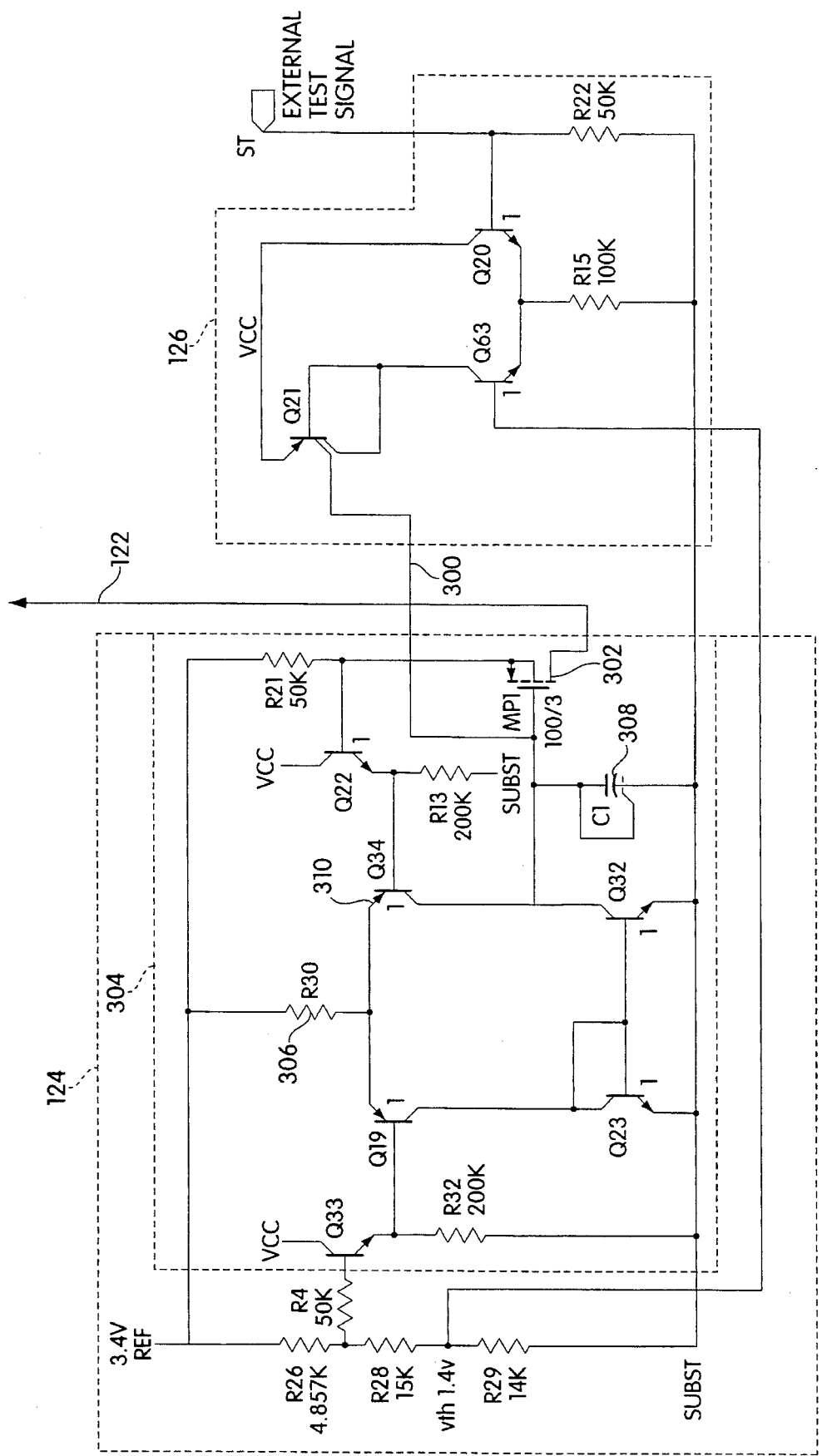
FIG. 5 is a schematic diagram of an example of the test circuit in accordance with the present invention.

A schematic diagram of one example of a suitable test circuit 120 is shown in FIG. 5. The test circuit 120 includes digital interface circuit 126, which converts a low level digital external test signal (0 volts) to a current applied through a node 300 to the gate of a transistor 302. The current supplied by circuit 126 on node 300 overcomes control amplifier 304 of current source 124 and thus inhibits the current source 124 from supplying a test signal on line 122. When a high level digital external test signal (>about 1.4 volts) is applied to digital interface circuit 126, the current supplied through node 300 is turned off, thus allowing current source 124 to operate. When the current source 124 is operational, a precise current is applied to the beam of the microstructure (node 72 in FIG. 3) on line 122. The application of this current is regulated by control amplifier 304. The bandwidth of control amplifier 304 is set by the differential input stage transconductance, established by the value of a resistor 306, and a compensation capacitor 308. When the external test signal turns off the current through node 300, capacitor 308 is charged through resistor 306 and transistor 310, and a current of controlled risetime is supplied by transistor 302 on line 122.

The current signal risetime, $T_r$, is approximately $T_r = 2R_{306} \cdot C_{308}$, where $R_{306}$ and $C_{308}$ represent the values of resistor 306 and capacitor 308, respectively. In one example, the resistor 306 has a value of 3 megohms, and the capacitor 308 has a value of 20 picofarads. With the circuit biasing voltages shown in FIG. 5 and the above values of resistor 306 and capacitor 308, a current risetime of about 120 microseconds is obtained, which is approximately equivalent to a bandwidth of 1.3 kHz. This is sufficiently slow for a force balance loop of about 1 kHz unity gain bandwidth to substantially track and keep within acceptable limits of electrostatic deflection to prevent electrostatic capture and/or contact. In certain designs, it may be desirable to make the risetime somewhat faster than the force balance control loop bandwidth but still maintain enough control to prevent electrostatic capture. Selection of risetime is a design tradeoff between the system requirements, beam design, and electronic design. Maintaining the risetime below the closed loop bandwidth is ultimately safe, but may require excessive circuit area or complexity. A variety if different circuit configurations may be used within the scope of the present invention for supplying an actuation signal of controlled risetime to the micromechanical sensor.

The signal applied to the sensor on line 122 has been described above as a test signal for testing of the micromechanical apparatus. In general, the present invention is applicable to any actuation signal that is applied to a micromechanical device for electrostatic deflection thereof. The actuation signal may be applied to the movable element or to the stationary element of the micromechanical device, since a potential difference between these elements causes an attractive force. The invention is not limited to the micromechanical sensor configuration or to the sensing circuit shown and described herein. Furthermore, the invention is not limited to micromechanical sensors. In general, the invention is applicable to any microstructure that includes a stationary element and a movable element that are electrically conductive.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A micromechanical sensing apparatus, comprising:
   a micromechanical sensor including a stationary element and a movable element which are electrically conductive;

a force balance loop coupled to said micromechanical sensor for generating an output indicative of a sensed quantity and for electrostatically controlling a position of said movable element relative to said stationary element, said force balance loop having a prescribed closed loop bandwidth; and a circuit coupled to said micromechanical sensor for applying to the sensor an actuation signal for electrostatically deflecting said movable element relative to said stationary element, said actuation signal having a maximum amplitude, said circuit including circuitry for limiting the bandwidth of said actuation signal such that said force balance loop controls deflection of said movable element within maximum deflection limits selected to avoid electrostatic capture or contact between said movable element and said stationary element.

2. A micromechanical sensing apparatus as defined in claim 1 wherein said circuitry limits the bandwidth of said actuation signal to less than or equal to the closed loop bandwidth of said force balance loop.

3. A micromechanical sensing apparatus as defined in claim 1 wherein said stationary element and said movable element define a first capacitor and a second capacitor having a differential configuration such that as said movable element is deflected, one of said capacitors increases and the other of said capacitors decreases.

4. A micromechanical sensing apparatus as defined in claim 3 wherein said circuitry for limiting said signal bandwidth includes a timing capacitor and a charging circuit for charging said timing capacitor at a controlled rate.

5. A micromechanical sensing apparatus as defined in claim 3 wherein said force balance loop comprises:

means for generating first and second sinusoidal signals of equivalent amplitude and frequency and 180° out of phase with each other, means for supplying said first sinusoidal signal to said first capacitor, means for supplying said second sinusoidal signal to said second capacitor, a buffer amplifier having an input coupled to said first and second capacitor, and an output, and a demodulator having an input coupled to the output of said buffer amplifier and an output coupled to the input of said buffer amplifier, whereby the output of said demodulator is fed back to the input of said buffer amplifier.

6. A micromechanical sensing apparatus as defined in claim 3 wherein the closed loop bandwidth of said force balance loop is about 1 kHz.

7. A micromechanical sensing apparatus as defined in claim 1 wherein said micromechanical sensor comprises:

a semiconductor substrate having a surface, a plurality of posts extending from the surface of said substrate, a polysilicon bridge suspended from said posts, said bridge comprising a plurality of movable fingers which constitute said movable element, and a plurality of electrically conductive, substantially stationary fingers which constitute said stationary element, each of said substantially stationary fingers corresponding to one of said movable fingers and being positioned relative to said corresponding movable fingers such that said movable finger and said corresponding substantially stationary finger form a capacitor, whereby movement of said bridge causes said movable fingers to move relative to said substantially stationary fingers and alter the capacitance between said movable fingers and said corresponding substantially stationary fingers.

8. A micromechanical sensing apparatus defined in claim 7 wherein said micromechanical sensor, said force balance loop and said circuit are fabricated on said substrate, whereby said micromechanical sensing device has a monolithic construction.

9. A micromechanical sensing apparatus as defined in claim 1 wherein said micromechanical sensor comprises an acceleration sensor.

10. A micromechanical sensing apparatus as defined in claim 1 wherein said actuation signal is applied to the movable element of said micromechanical sensor.

11. A micromechanical sensing apparatus as defined in claim 1 wherein said actuation signal is applied to the stationary element of said micromechanical sensor.

12. A micromechanical sensing apparatus as defined in claim 1 wherein said actuation signal comprises a test signal.

13. A micromechanical sensing apparatus comprising:

a micromechanical sensor including a stationary element and a movable element which are electrically conductive, said micromechanical sensor having a mechanical resonance frequency;

a sensing circuit coupled to said micromechanical sensor for generating a signal indicative of a sensed quantity; and an actuation circuit coupled to said micromechanical sensor for applying to said sensor an actuation signal for electrostatically deflecting said movable element relative to said stationary element, said actuation circuit including circuitry for limiting the bandwidth of said actuation signal to prevent contact between said movable element and said stationary element.

14. A micromechanical sensing apparatus as defined in claim 13 wherein said actuation circuit limits the bandwidth of said actuation signal to about one tenth of said mechanical resonance frequency.

15. A micromechanical sensing apparatus as defined in claim 13 wherein said stationary element and said movable element define a first capacitor and a second capacitor having a differential configuration such that as said movable element is deflected, one of said capacitors increases and the other of said capacitors decreases.

16. A micromechanical sensing apparatus as defined in claim 13 wherein said micromechanical sensor comprises:

a semiconductor substrate having a surface, a plurality of posts extending from the surface of said substrate, a polysilicon bridge suspended from said posts, said bridge comprising a plurality of movable fingers which constitute said movable element, and a plurality of electrically conductive, substantially stationary fingers which constitute said stationary element, each of said substantially stationary fingers corresponding to one of said movable fingers and being positioned relative to said corresponding movable fingers such that said movable finger and said corresponding substantially stationary finger form a capacitor, whereby movement of said bridge causes said movable fingers to move relative to said substantially stationary fingers and alter the capacitance between said movable fingers and said corresponding substantially stationary fingers.

17. A micromechanical sensing apparatus as defined in claim 13 wherein said micromechanical sensor comprises an acceleration sensor.

18. A micromechanical sensing apparatus as defined in claim 13 wherein said actuation signal is applied to the movable element of said micromechanical sensor.

19. A micromechanical sensing apparatus as defined in claim 13 wherein said actuation signal is applied to the stationary element of said micromechanical sensor.

20. A micromechanical sensing apparatus as defined in claim 13 wherein said actuation signal comprises a test signal.

21. In micromechanical sensing apparatus comprising a micromechanical sensor including a stationary element and a movable element which are electrically conductive, and a force balance loop coupled to said micromechanical sensor for generating an output indicative of a sensed quantity and for electrostatically controlling a position of said movable element relative to said stationary element, a method for actuating said micromechanical sensing device, comprising:

applying to the micromechanical sensor an actuation signal for electrostatically deflecting said movable element relative to said stationary element, said actuation signal having a maximum amplitude; and limiting the bandwidth of said actuation signal such that said force balance loop controls deflection of said movable element within maximum deflection limits selected to avoid electrostatic capture or contact between said movable element and said stationary element.

22. A method as defined in claim 21 wherein said force balance loop has a prescribed closed loop bandwidth and wherein the step of limiting the bandwidth of the actuation signal includes limiting the bandwidth to less than or equal to the closed loop bandwidth of said force balance loop.

23. A micromechanical apparatus comprising:

a micromechanical device including a stationary element and a movable element which are electrically conductive, said micromechanical device having a mechanical resonance frequency; and an actuation circuit coupled to said micromechanical device for applying to said device an actuation signal for electrostatically deflecting said movable element relative to said stationary element, said actuation circuit including circuitry for limiting the bandwidth of said actuation signal to prevent contact between said movable element and said stationary element.

24. A micromechanical apparatus as defined in claim 23 wherein said circuitry limits the bandwidth of said actuation signal to about one tenth of said mechanical resonance frequency.

25. A micromechanical apparatus as defined in claim 23 further including a force balance loop coupled to said micromechanical device for electrostatically controlling a position of said movable element relative to said stationary element, said force balance loop having a prescribed closed loop bandwidth, said circuitry limiting the bandwidth of said actuation signal such that said force balance loop controls deflection of said movable element within maximum deflection limits.

26. A micromechanical apparatus as defined in claim 25 wherein said circuitry limits the bandwidth of said actuation signal to less than or equal to the closed loop bandwidth of said force balance loop.

\* \* \* \* \*